(12) United States Patent
Wolfsgruber (10) Patent No.: US 11,614,028 B2
(45) Date of Patent: Mar. 28, 2023

(54) TURBOCHARGER AND TURBINE WHEEL FOR A TURBINE OF A TURBOCHARGER

(71) Applicant: BRP-ROTAX GMBH & CO. KG, Gunskirchen (AT)

(72) Inventor: Markus Wolfsgruber, Neukirchen bei Altmuenster (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 17/553,190

(22) Filed: Dec. 16, 2021

(65) Prior Publication Data
US 2022/0195912 A1 Jun. 23, 2022

Related U.S. Application Data (60) Provisional application No. 63/128,333, filed on Dec. 21, 2020.

(51) Int. Cl.
*F02B 33/40* (2006.01)
*F01D 5/14* (2006.01)

(52) U.S. Cl.
CPC .............. *F02B 33/40* (2013.01); *F01D 5/141* (2013.01)

(58) Field of Classification Search
CPC ...... F02B 33/40; F02B 37/00; F05D 2220/40; F01D 5/048; F01D 5/141; F01D 5/143
See application file for complete search history.

(56) References Cited

U.S. PATENT DOCUMENTS

| 6,471,474 | B1 | 10/2002 | Mielke et al. |
| 10,577,934 | B2* | 3/2020 | Volpert .................. F02B 39/00 |
| 2002/0127108 | A1 | 9/2002 | Crall et al. |
| 2003/0014972 | A1* | 1/2003 | Arnold .................. F01D 17/165 60/602 |
| 2012/0269635 | A1* | 10/2012 | Xu .......................... F01D 5/143 416/183 |

(Continued)

FOREIGN PATENT DOCUMENTS

WO 20210152167 A1 8/2021

OTHER PUBLICATIONS

Mattheck et al., Easing cracks with the Method of Tensile Triangles, WIT Transactions on Ecology and the Environment, vol. 138, Design and Nature V, 2010.

*Primary Examiner* — Jesse S Bogue
(74) *Attorney, Agent, or Firm* — BCF LLP (57) ABSTRACT

A turbine wheel for a turbine of a turbocharger. The turbine wheel includes a plurality of turbine blades distributed evenly about the axis of rotation; and a plurality of inter-blade portions distributed evenly about the axis of rotation. Each of the inter-blade portions is disposed between two blades and each of the blades is disposed between two inter-blade portions, the inter-blade portions and the turbine blades being integrally formed. A cross-section, taken along a plane normal to the axis of rotation, of a surface of each inter-blade portion of the plurality of inter-blade portions being described by a smooth curve extending between the two turbines blades of the plurality of turbine blades between which the inter-blade portion is disposed. In some cases, the smooth curve of each inter-blade portion is described by a curve fitted to a biomimicry design form extending between the first blade and the second blade.

12 Claims, 13 Drawing Sheets

(56) References Cited

U.S. PATENT DOCUMENTS

| | | | | |
|---|---|---|---|---|
| 2015/0118080 A1* | 4/2015 | Dextraze | ............... | F04D 29/284 |
| | | | | 417/406 |
| 2016/0003059 A1* | 1/2016 | Otsubo | ..................... | F01D 5/28 |
| | | | | 416/241 R |
| 2020/0392848 A1* | 12/2020 | Babak | ..................... | F01D 5/048 |
| 2021/0222639 A1 | 7/2021 | Killingseder et al. | | |

* cited by examiner

TURBOCHARGER AND TURBINE WHEEL FOR A TURBINE OF A TURBOCHARGER

CROSS-REFERENCE

The present application claims priority to U.S. Provisional Patent Application No. 63/128,333, entitled "Turbocharger and Turbine Wheel for a Turbine of a Turbocharger," filed Dec. 21, 2020, the entirety of which is incorporated herein by reference.

FIELD OF TECHNOLOGY

The present technology relates to turbochargers and turbine wheels for turbines of turbochargers.

BACKGROUND

Internal combustion engines are sometimes provided with a turbocharger that is configured to increase the engine's efficiency by feeding additional compressed air into the engine's cylinder(s). The turbocharger is turbine-driven, where a turbine wheel on a rotating turbine shaft is driven by exhaust gas from the vehicle engine.

Turbine wheels are traditionally formed from blades extending outward from a wheel hub, with fillets smoothing the transition from blade to hub at the blade base. As the turbine wheels are driven by exhaust from a vehicle engine, turbine wheels need to resist heat in addition to forces on the blades during utilization.

In order to better resist the heat and wear on the wheel in use, the turbine wheels could be formed from denser, more heat resistant material, or the blades could have a greater overall thickness. In either case however, there would be in turn higher stress on the fillets between the blades and the hub, possibility leading to increased risk of fatigue or strain induced failures. Increased density and/or increased blade thickness also increases the inertia of the turbine wheel, which can also be disadvantageous for turbocharger operation and lifetime.

There is therefore a desire for a turbine wheel for a turbocharger which overcomes at least some of these challenges.

SUMMARY

It is an object of the present technology to ameliorate at least some of the inconveniences present in the prior art.

According to one aspect of the present technology, there is provided a turbine wheel for a turbocharger with a new blade design. Specifically, rather than connecting the blades to the hub by fillets, the wheel includes inter-blade portions extending between the blades. The inter-blade portions have a smoothly curved cross-section, determined using a biomimicry design technique. Rather than having peak stress accumulation at the fillets like in the prior art, the smoothly curving surface of the inter-blade portions distributes the stress over a larger area, reducing peak stresses. This can aid in decreasing high fatigue risk and high creep strain. The overall design of the turbine wheel as presented herein also allows for additional scalloping the surface opposite the turbine outlet (parallel with the intake flow direction), without an overly detrimental impact on the natural frequency of the wheel. By scalloping the surface, the overall weight of the wheel can be reduced by up to 5%, or more depending on the specific turbine wheel. As inertia depends on mass and radial size of an object, the decrease in mass and the decrease in the portion of the wheel with a larger radius generally decreases the inertia. In some embodiments, the inertia could be reduced by about 25% or more, compared with the full wall.

According to one aspect of the present technology, there is provided a turbine wheel for a turbine of a turbocharger. The turbine wheel includes a plurality of turbine blades, the turbine wheel having an axis of rotation, the plurality of turbine blades being distributed evenly about the axis of rotation; and a plurality of inter-blade portions distributed evenly about the axis of rotation, each one of the plurality of inter-blade portions being disposed between two of the plurality of turbine blades, each one of the plurality of turbine blades being disposed between two of the plurality of inter-blade portions, the plurality of inter-blade portions and the plurality of turbine blades being integrally formed, a cross-section, taken along a plane normal to the axis of rotation, of a surface of each inter-blade portion of the plurality of inter-blade portions being described by a smooth curve extending between the two turbines blades of the plurality of turbine blades between which the inter-blade portion is disposed.

In some embodiments, the smooth curve of the cross-section of the surface of each inter-blade portion is described by a curve fitted to a biomimicry design form extending between the first blade and the second blade.

In some embodiments, the biomimicry design form is a tensile-triangle design form for reducing stress concentrations.

In some embodiments, the turbine wheel further includes a compressor side surface extending normal to the axis of rotation at a first end of the turbine wheel; and the compressor side surface has a scalloped form.

In some embodiments, the compressor side surface occupies no more than 50% of an area of a circle circumscribing an outer-most edge of the compressor side surface.

In some embodiments, the turbine wheel further includes a hub portion, the plurality of turbine blades and the plurality of inter-blade portions being integrally formed with the hub portion.

In some embodiments, the smooth curve of the cross-section of the surface of each inter-blade portion is concave.

According to another aspect of the present technology, there is provided a turbocharger for an engine, including a turbine including a turbine wheel according to any of the embodiments above, and a compressor operatively connected to the turbine, the turbine driving the compressor when the turbocharger is in use.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale unless otherwise noted.

DETAILED DESCRIPTION

The present technology of a turbine wheel for a turbine of a turbocharger will be described below with respect to a turbocharger for a four-stroke, multiple-cylinder internal combustion engine intended for powering a vehicle. It is contemplated that at least some aspects of the present technology could vary depending on the specific technical details of the turbocharger and/or the engine for which the turbocharger is designed.

Figure 1:
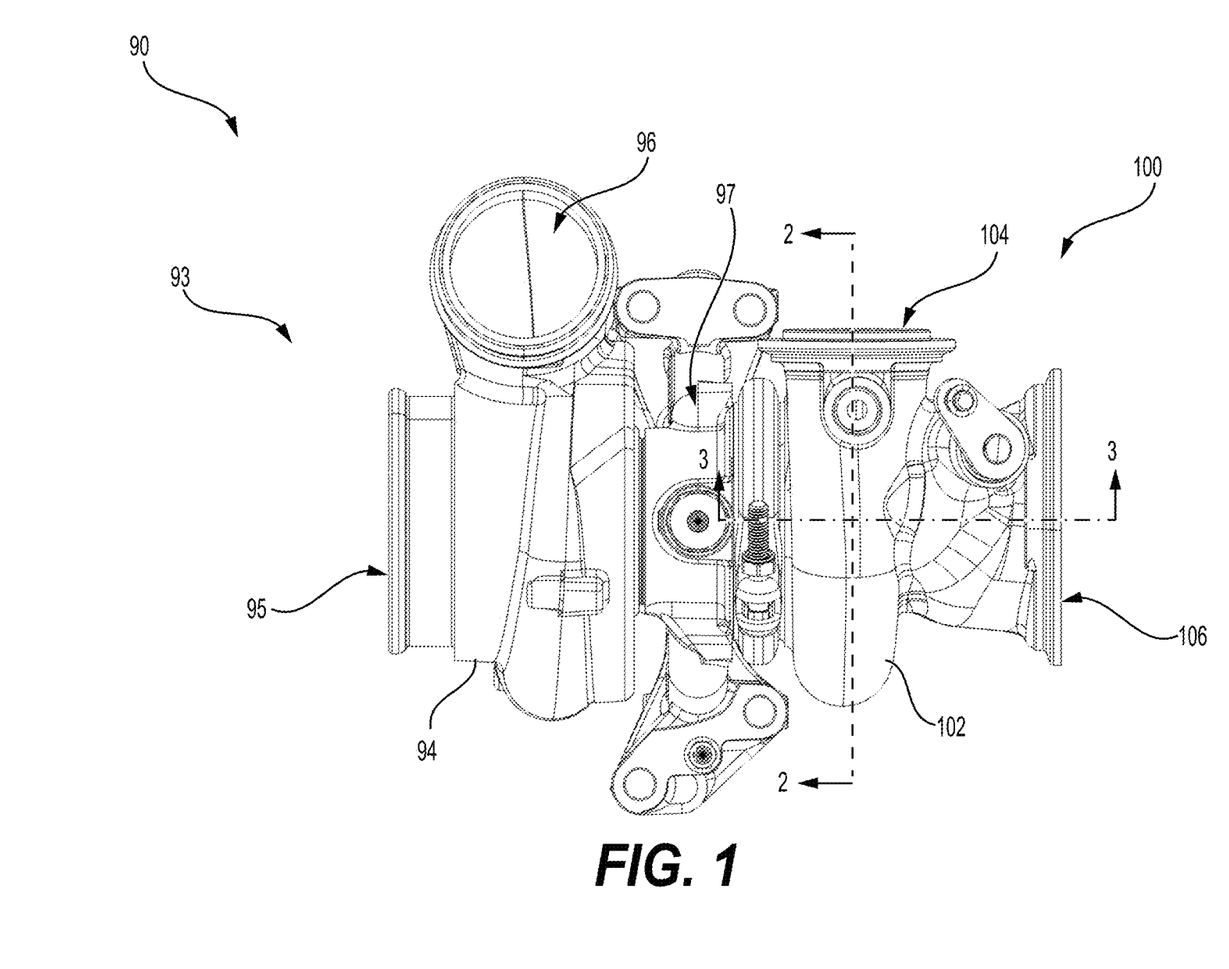
FIG. 1 is a side elevation view of a turbocharger including a compressor and a turbine.
Figure 2:
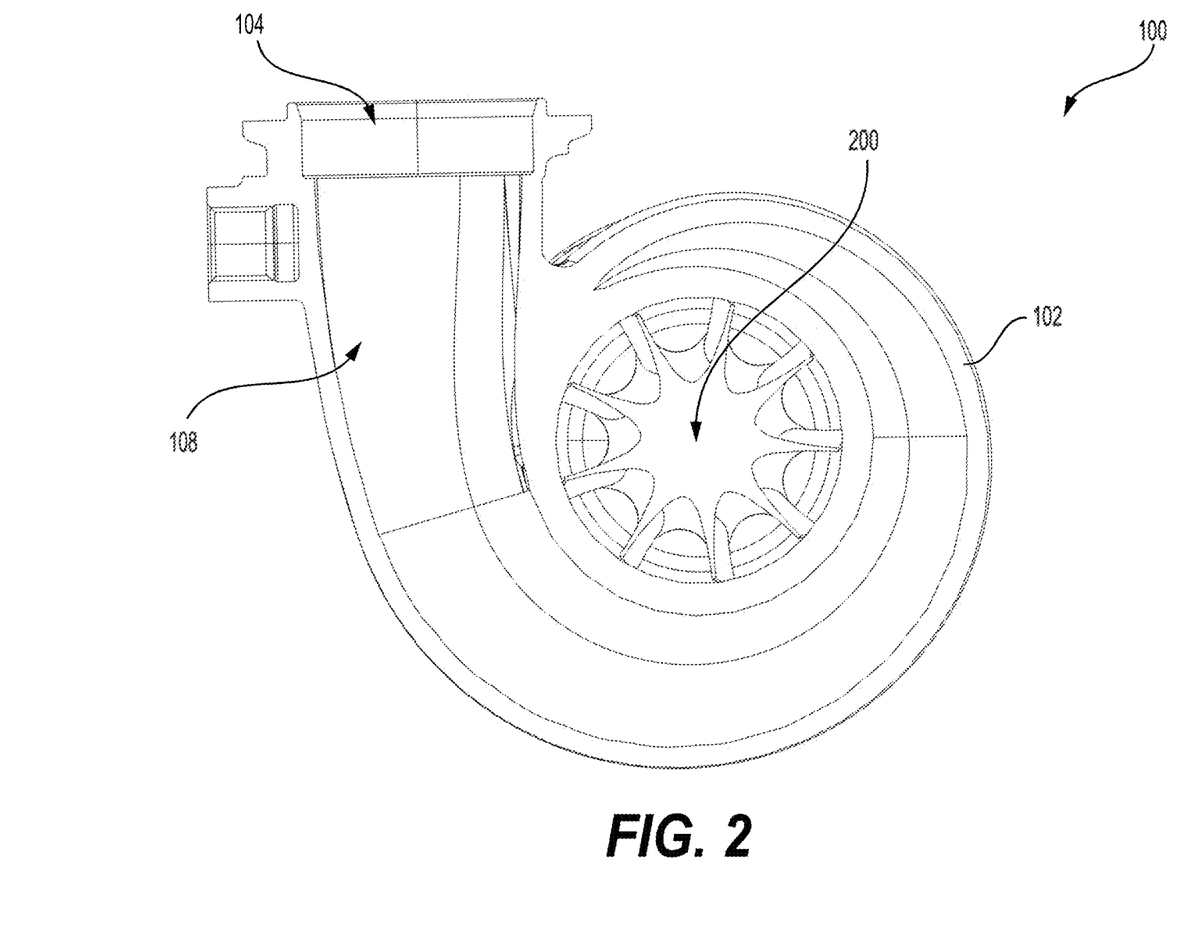
FIG. 2 is a section of the turbine of FIG. 1, taken along line 2-2 of FIG. 1.
Figure 3:
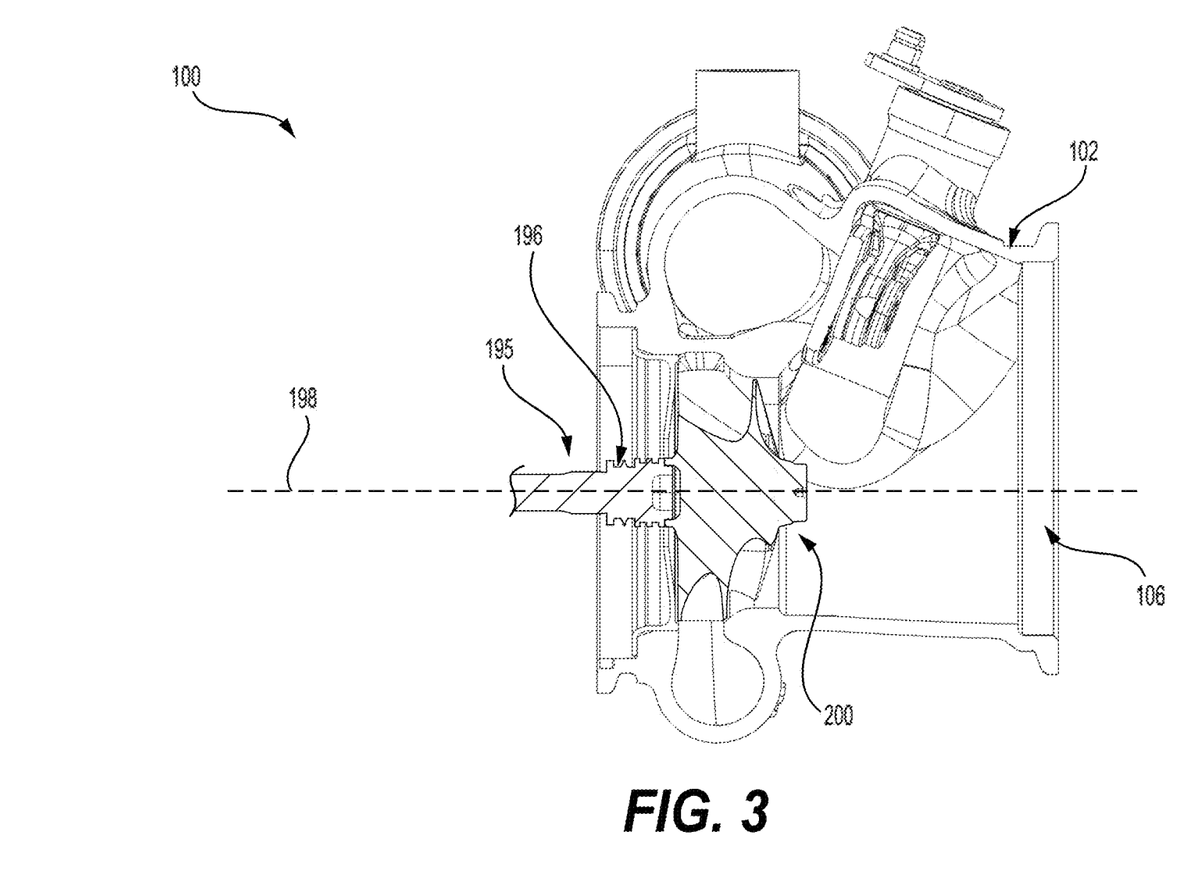
FIG. 3 is a cross-sectional view of the turbine of FIG. 1, taken along line 3-3 of FIG. 1.

With reference to FIGS. 1 to 3, a turbocharger 90 configured for a four-stroke, internal combustion engine (not shown) will be described. The turbocharger 90 is formed from a compressor 93 and a turbine 100.

Figure 4:
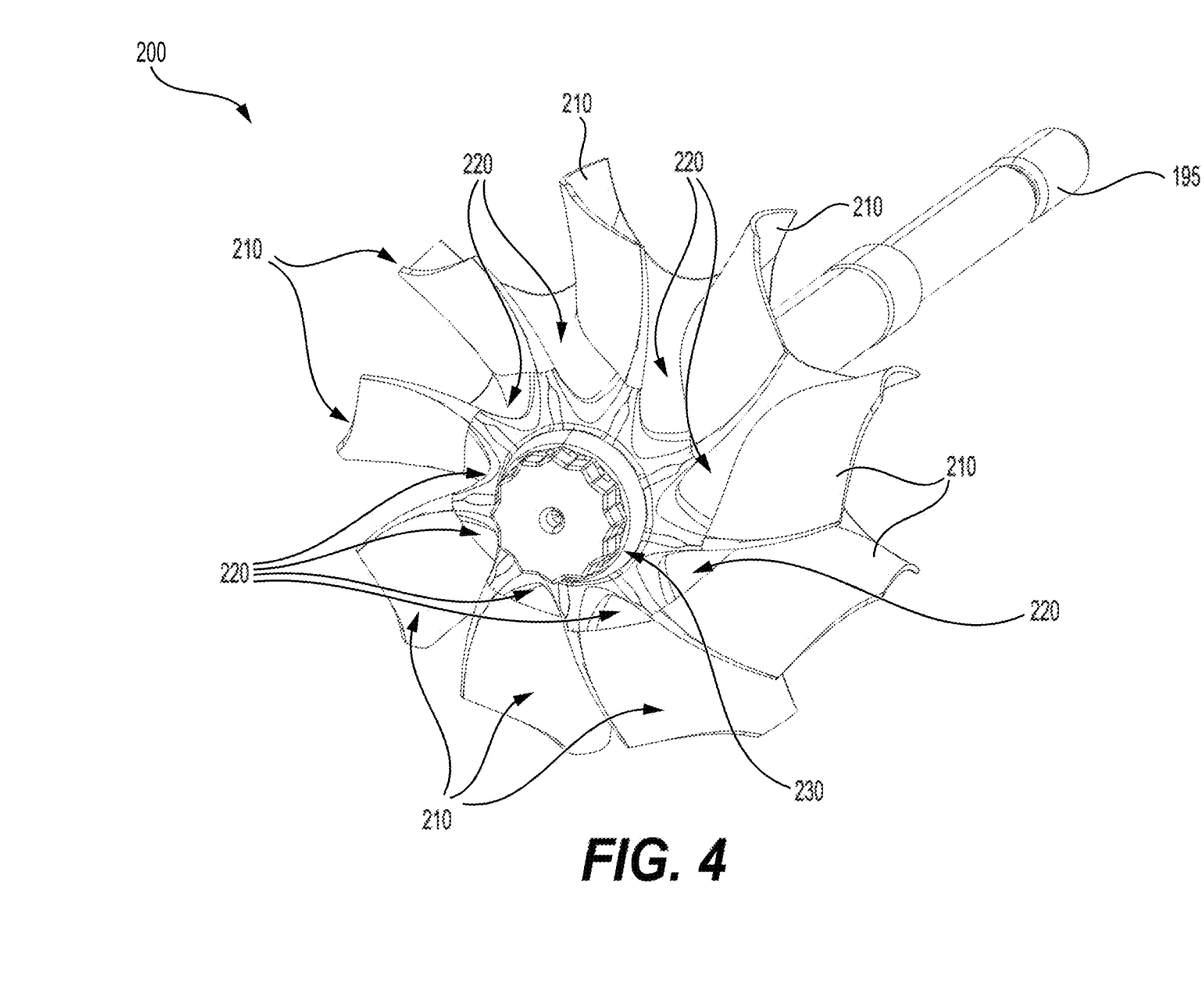
FIG. 4 is a top, downstream, side perspective view of a turbine wheel and shaft of the turbine of FIG. 1.

The compressor 93 and the turbine 100 are rotatably linked to each other via a shaft 195 (see also FIG. 4). The shaft 195 defines an axis of rotation 198 of the turbine 100 (see also FIG. 7), about which a turbine wheel 200 and a compressor wheel (not shown) turn when the turbocharger 90 is in use.

The turbine 100 includes a turbine housing 102 and the turbine wheel 200 housed within the turbine housing 102. The turbine housing 102 is configured for fluidly connecting to an exhaust manifold (not shown) to receive exhaust gas discharged from the engine and to an exhaust system (not shown) for sending exhaust gases out of the vehicle.

To that end, the turbine housing 102 defines an inlet 104 in fluid communication with the outlet of the exhaust manifold and through which the exhaust gases enter the turbine housing 102. The turbine housing 102 also defines an outlet 106 in fluid communication with the exhaust system for expelling the exhaust gas.

The turbine wheel 200 is mounted to an end 196 of the shaft 195 for rotation therewith. When the turbocharger 90 is in use, the turbine wheel 200 is driven by the exhaust gases flowing into the inlet 104 and through a volute 108 defined in the turbine housing 102. In use, the exhaust gases that enter the chamber 108 in the turbine housing 102 cause the turbine wheel 200, and thus the shaft 195 to which the turbine wheel 200 is mounted, to rotate about the axis 198 of the shaft 195.

The compressor 93 includes a compressor housing 94 and a compressor wheel (not shown) housed within the compressor housing 94. The compressor housing 94 defines an inlet 95 through which ambient air enters the compressor housing 94. The compressor housing 94 also defines an outlet 96 in fluid communication with intake ports of cylinders of the engine. The compressor wheel is mounted to an end of the shaft 195 (opposite the end 196) for rotation therewith and is driven by rotation of the shaft 195. Thus, during operation of the turbocharger 90, the compressor wheel rotates together with the shaft 195 which causes air to be drawn into the compressor housing 94 through the inlet 95. The air is compressed and then expelled through the outlet 96 toward intake ports of the engine.

Disposed axially between the compressor wheel and the turbine wheel 200 is a bearing housing 97. The bearing housing 97 defines a bearing chamber (not shown) for receiving a bearing cartridge (not shown) that rotatably supports the shaft 195 relative to the bearing housing 97. The bearing chamber is a cylindrical bore coaxial with the shaft 195.

With additional reference to FIGS. 4 to 9, the turbine wheel 200 according to the present technology will now be described in more detail. As is mentioned above, the turbine wheel 200 is mounted to the shaft 195, and the shaft 195 defines the axis of rotation 198 about which the wheel 200 turns when in use.

Figure 5:
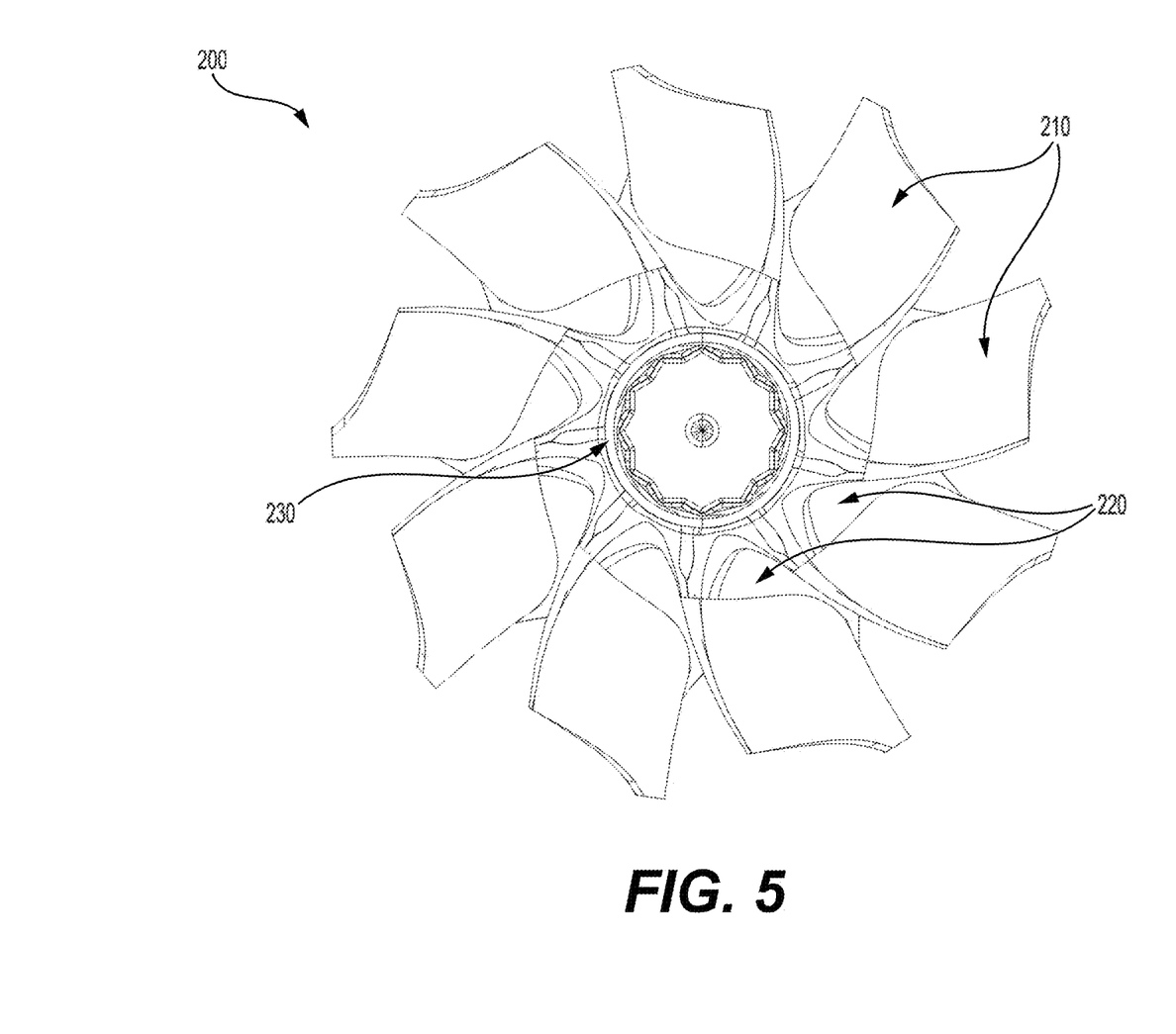
FIG. 5 is a downstream side elevation view of the turbine wheel of FIG. 4.

The turbine wheel 200 includes a plurality of turbine blades 210 distributed evenly about the axis of rotation 198. In the illustrated embodiment, the wheel 200 has nine blades 210. It is contemplated that the wheel 200 could include more or fewer than nine blades 210. The exact number of blades 210 in any given embodiment depends on various technical requirements of the turbocharger 90, including but not limited to: air mass flow, turbocharger rotation speed, compressor boost pressure, turbocharger weight, turbine dimensions, required drive power for the compressor 93, exhaust gas temperature, exhaust gas mass flow, and required rotation speed of the compressor 93. Similarly, the specific form, such as the length, shape, or thickness, of each blade 210 could vary from that shown in the present illustrated embodiment.

The turbine wheel 200 also includes a plurality of inter-blade portions 220 distributed evenly about the axis of rotation 198. The turbine blades 210 are separated by the inter-blade portions 220. As such, each inter-blade portion 220 is disposed between two of the turbine blades 210 and each turbine blade 210 is disposed between two of the inter-blade portions 220. The inter-blade portions 220 and the turbine blades 210 are integrally formed, such that the turbine blades 210 extend smoothly out from the inter-blade portions 220.

As there are nine turbine blades 210, the illustrated embodiment of the turbine wheel 200 thus has nine inter-blade portions 220. The number of inter-blade portions 220 depend on the number of blades 210 on any particular embodiment of the turbine wheel 200, and the number of blades 210 can vary as described above.

The turbine wheel 200 further includes a hub portion 230. The turbine blades 210 and the inter-blade portions 220 are integrally formed with the hub portion 230. The hub portion 230 is the portion of the turbine wheel 200 disposed radially inward of the blades 210 and the inter-blade portions 220. The hub portion 230 defines a passage 232 into which the shaft 195 extends.

Figure 6:
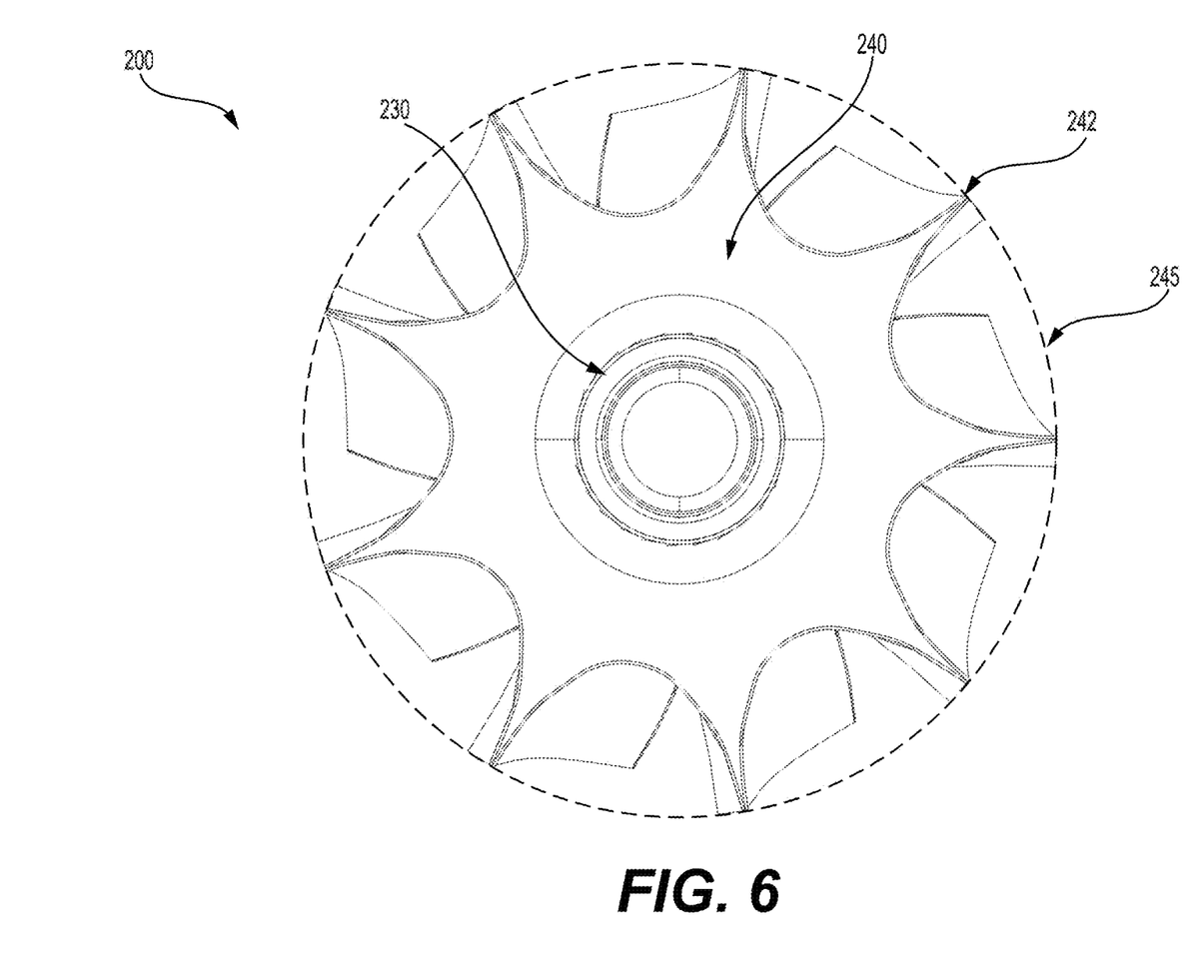
FIG. 6 is a compressor side elevation view of the turbine wheel of FIG. 4.
Figure 7:
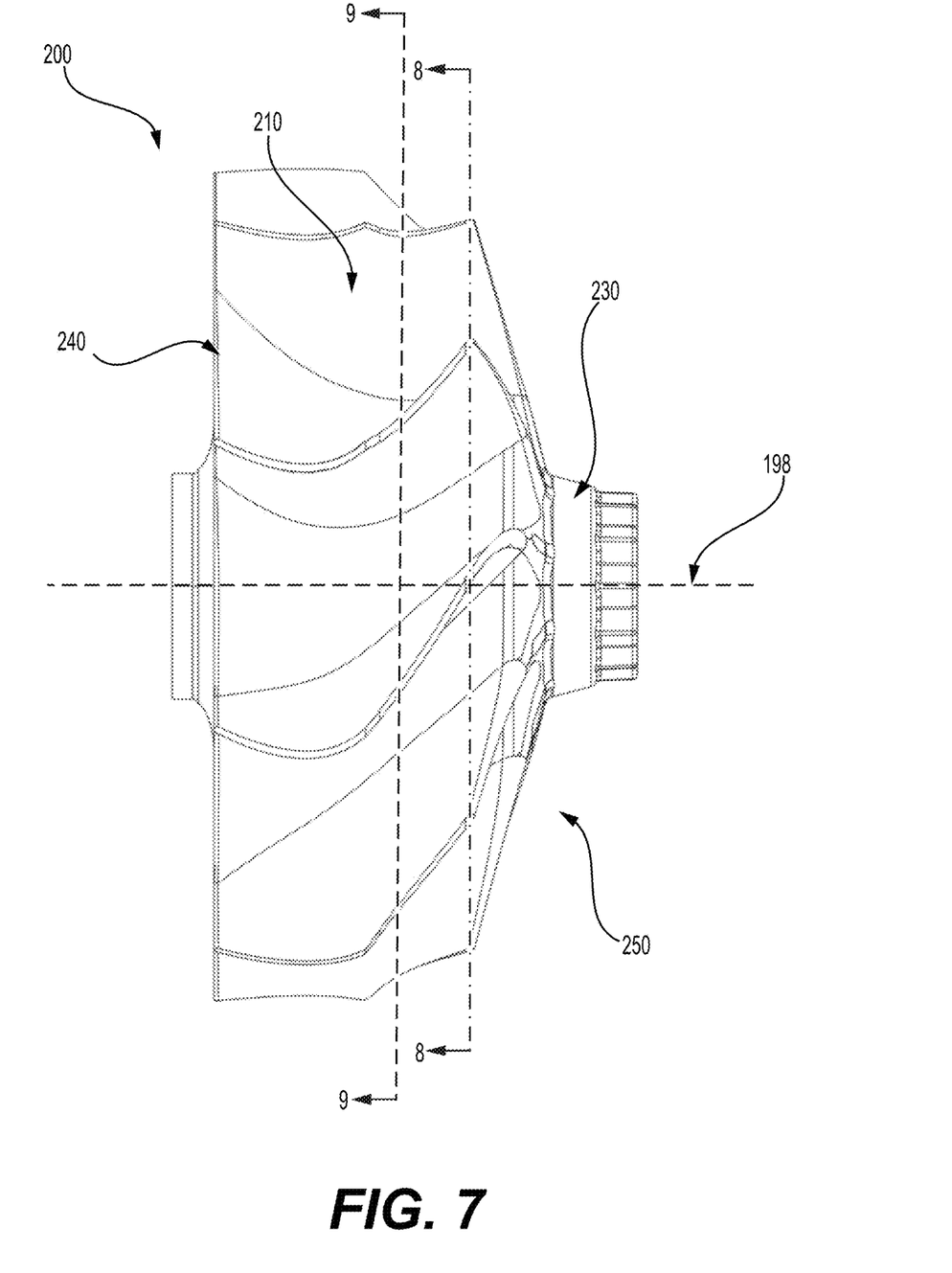
FIG. 7 is a side elevation view of the turbine wheel of FIG. 4.

As can be seen in FIGS. 6 and 7, the turbine wheel 200 has a compressor side surface 240 which extends normal to the axis of rotation 198. The compressor side surface 240 is disposed at a first end of the turbine wheel 200, opposite a downstream end 250 of the turbine wheel 200.

The compressor side surface 240 of the turbine wheel 200 has a scalloped form, with scalloping between the blades 210. By decreasing the material in the turbine wheel 200, including by removing material from the compressor side of the wheel 200, the overall weight of the turbine wheel 200 can be decreased. Decreasing the overall weight of the turbine wheel 200 can be advantageous as it decreases the inertia of the turbine wheel 200. Since inertia depends on both mass and radius of an object, each reduction in weight and radial size could have a substantial impact on the final inertia of the wheel 200. In at least some non-limiting embodiments, the compressor side surface 240 occupies no more than 50% of an area of a circle 245 circumscribing an outer-most edge 242 of the compressor side surface 240. In the illustrated embodiment, the compressor side surface 240 occupies 47% of the area of the circumscribing circle 245 (including the cross-section of the shaft 195 and the hub portion 230), but it is contemplated that the surface 240 could occupy more or less of the area of the circle 245.

Figure 8:
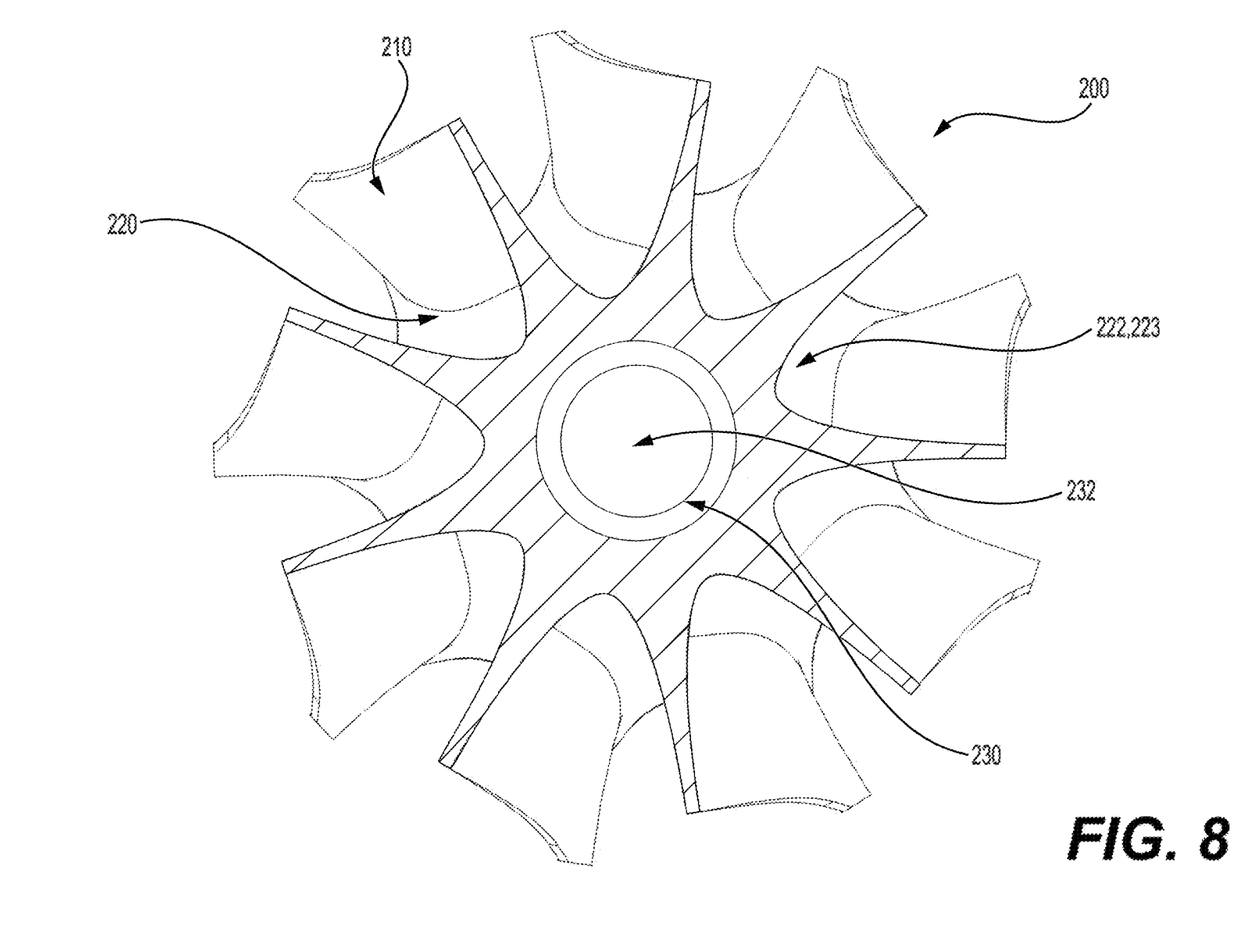
FIG. 8 is a cross-sectional view of the turbine wheel of FIG. 4, taken along line 8-8 of FIG. 7.
Figure 9:
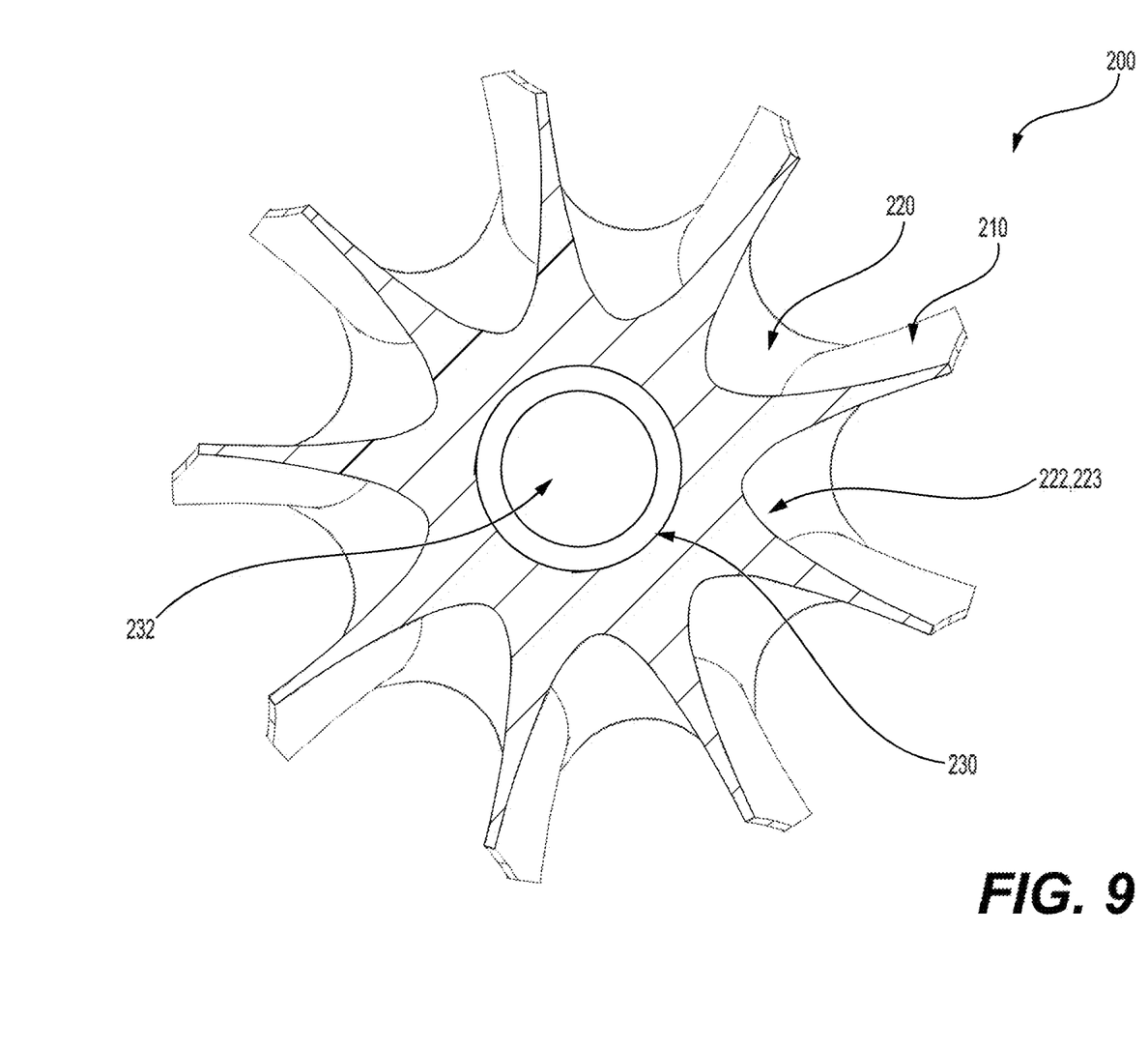
FIG. 9 is another cross-sectional view of the turbine wheel of FIG. 4, taken along line 9-9 of FIG. 7.

The form of the surfaces of the inter-blade portions 220, according to the present technology, will now be described. Cross-sectional views of the turbine wheel 200 are shown in FIGS. 8 and 9, taken along a plane normal to the axis of rotation 198, illustrating surfaces 222 of the inter-blade portions 220. The surface 222 of each inter-blade portion 220 is described by a smooth curve 223 extending between the two turbines blades 210 between which the inter-blade portion 220 is disposed. As can be further seen in the Figures, the smooth curve 223 of the cross-section surface 222 of each inter-blade portion 220 is concave.

According to embodiments of the present technology, the smooth curve 223 of the cross-section surface 222 of each inter-blade portion 220 is described by a curve fitted to a biomimicry design form extending between the two adjacent turbine blades 210. The biomimicry design form of the illustrated embodiment is a tensile-triangle design form for reducing stress concentrations. Derivation and implementation of a tensile-triangle design technique is described in the article *Easing cracks with the Method of Tensile Triangles* by Mattheck, Wissner, Tesari, and Bethge (WIT Transactions on Ecology and the Environment, Vol. 138, Design and Nature V, 2010), the entirety of which is incorporated herein by reference.

Figure 10:
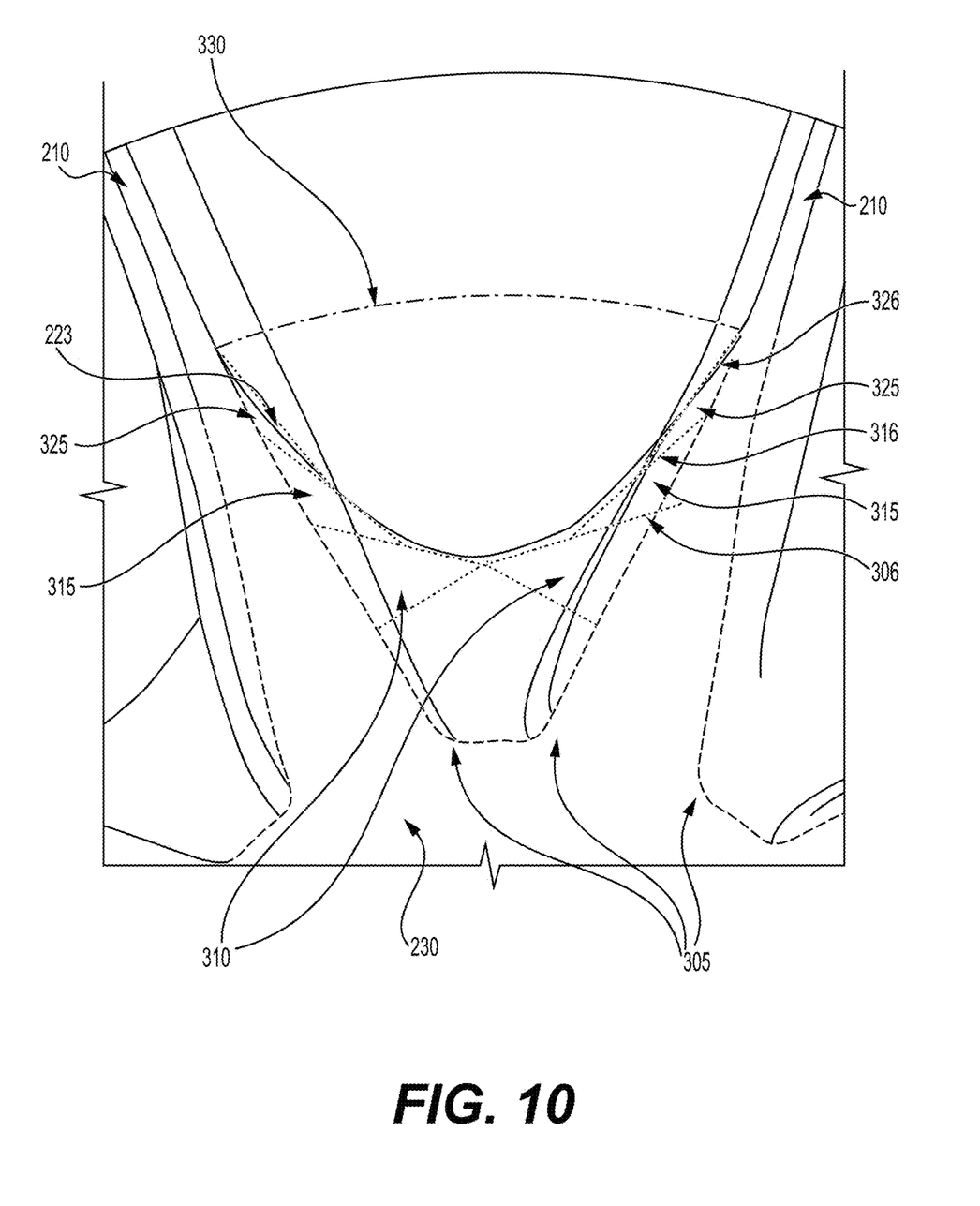
FIG. 10 is schematic drawing illustrating some steps of a biomimicry design technique for the turbine wheel of FIG. 4, with a prior art fillet version shown in broken lines.

An example determination of the inter-blade portion surface 223 using the tensile-triable technique of Mattheck et al. is illustrated schematically in FIG. 10. A portion of a prior art wheel 15 (described in more detail below) is illustrated in broken lines in FIG. 10. The surface curve 223 is generally determined as follows. Two first triangles 310 are drawn bridging neighboring corners 305 between two blades 210 and the hub 230. A right angle of each triangle 310 is drawn perpendicular to its corresponding blade 210, with the two neighboring triangles 310 meeting at another angle of each triangle 310. The triangles 310 reduce each individual angle between the blades 210 and the space between blades 210, which reduces stress accumulation at any one particular corner. A second triangle 315 is then drawn from a mid-point of an upper edge 306 each first triangle 305 to the corresponding blade 210 to further increase the number of obtuse angles between each blade 210 and the space between the blades 210. A third triangle 325 is then similarly drawn from a mid-point of an upper edge 316 of each second triangle 315 to the corresponding blade 210. The upper edges 306, 316 and an upper edge 326 of the third triangle 326 all have the same length. The inter-blade portion surface 223 is then determined by fitting and smoothing a spline through the points of the triangles 305, 315, 325. According to at least some embodiments, the surface curve 223 joins the blade 210 with a constantly varying curvature to further reduce stress at the junction between the surface 222 and the blade 210.

A top vertex of each third triangle 325 generally corresponds to the junction between the surface curve 223 and the blade 210. This top vertex defines a maximum radius 330 of the inter-blade portion 220 (shown in dot-dash line). During design of the turbine wheel 200, the radius 300 is chosen depending on required or desired technical aspects of the turbine wheel 200. For instance, the radius 330 affects the stiffness and resonance frequency or frequencies of the blades 210. As can be seen in FIG. 10, placement of the triangles 305, 315, 325 depends on the desired radius 330 and thus can be adjusted in order to achieve the desired radius 330. Depending on the embodiment, more or fewer of triangles could be fitted in the manner described above in order to determine the surface curve 223. It should be noted that the surface curve 223 evolves along the longitudinal direction of the wheel 200 (i.e. parallel to the axis of rotation 198) as the blades 210 curve along the longitudinal direction, such that the cross-section of the inter-blade portions 220 could vary at different longitudinal points.

Figure 11:
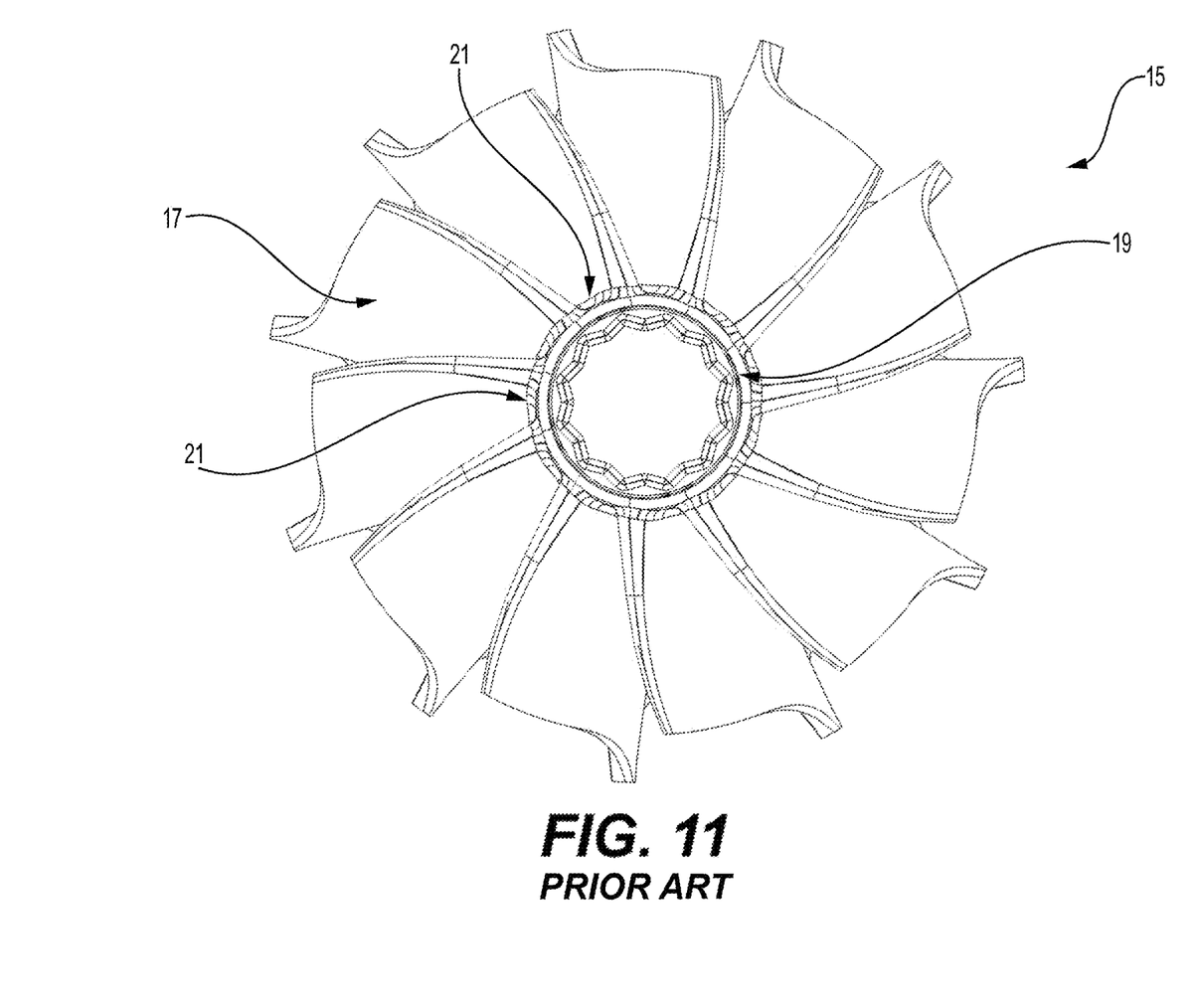
FIG. 11 is a downstream side elevation view of a turbine wheel according to the prior art.
Figure 12:
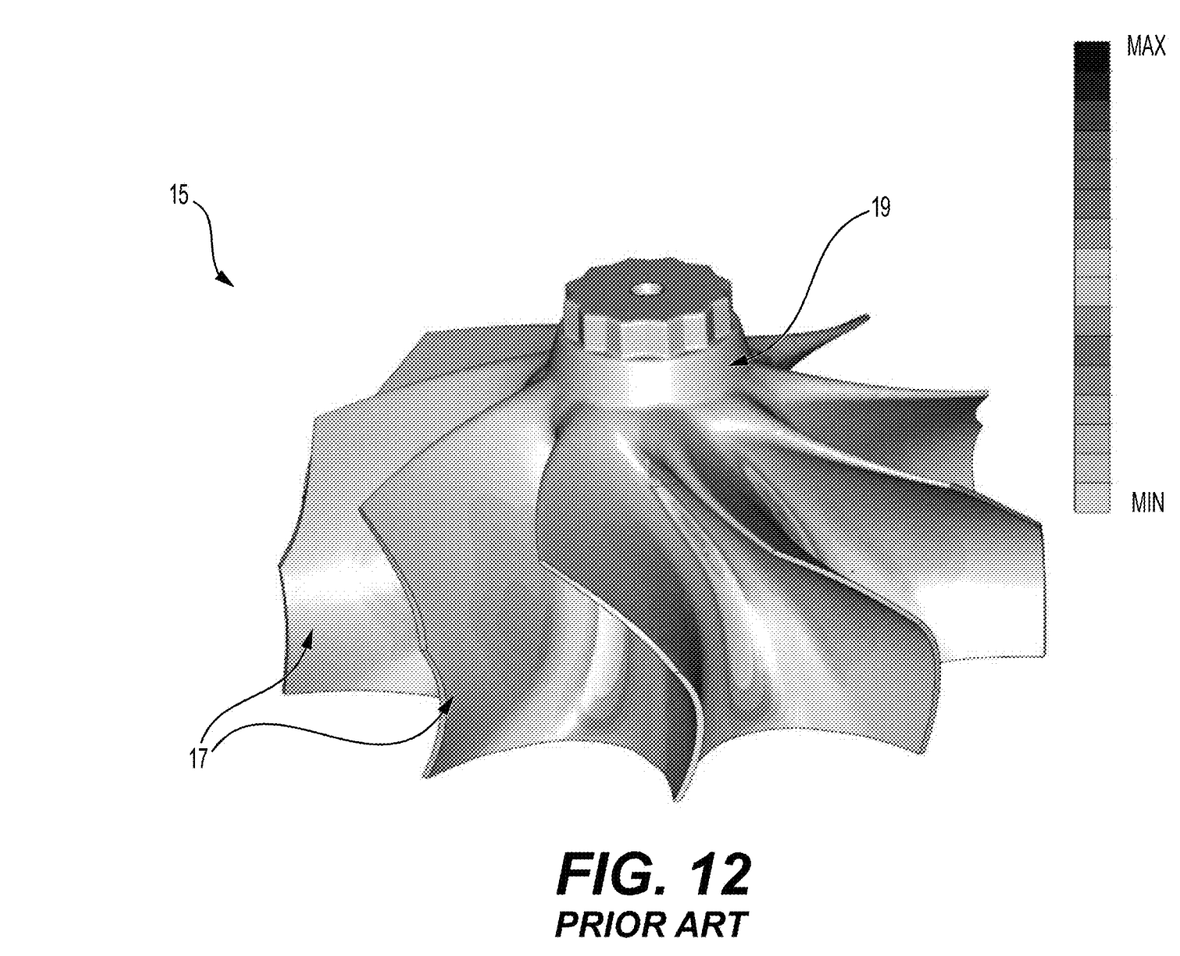
FIG. 12 is a perspective view of the prior art turbine wheel of FIG. 11, with a simulation of in-use stress distribution.
Figure 13:
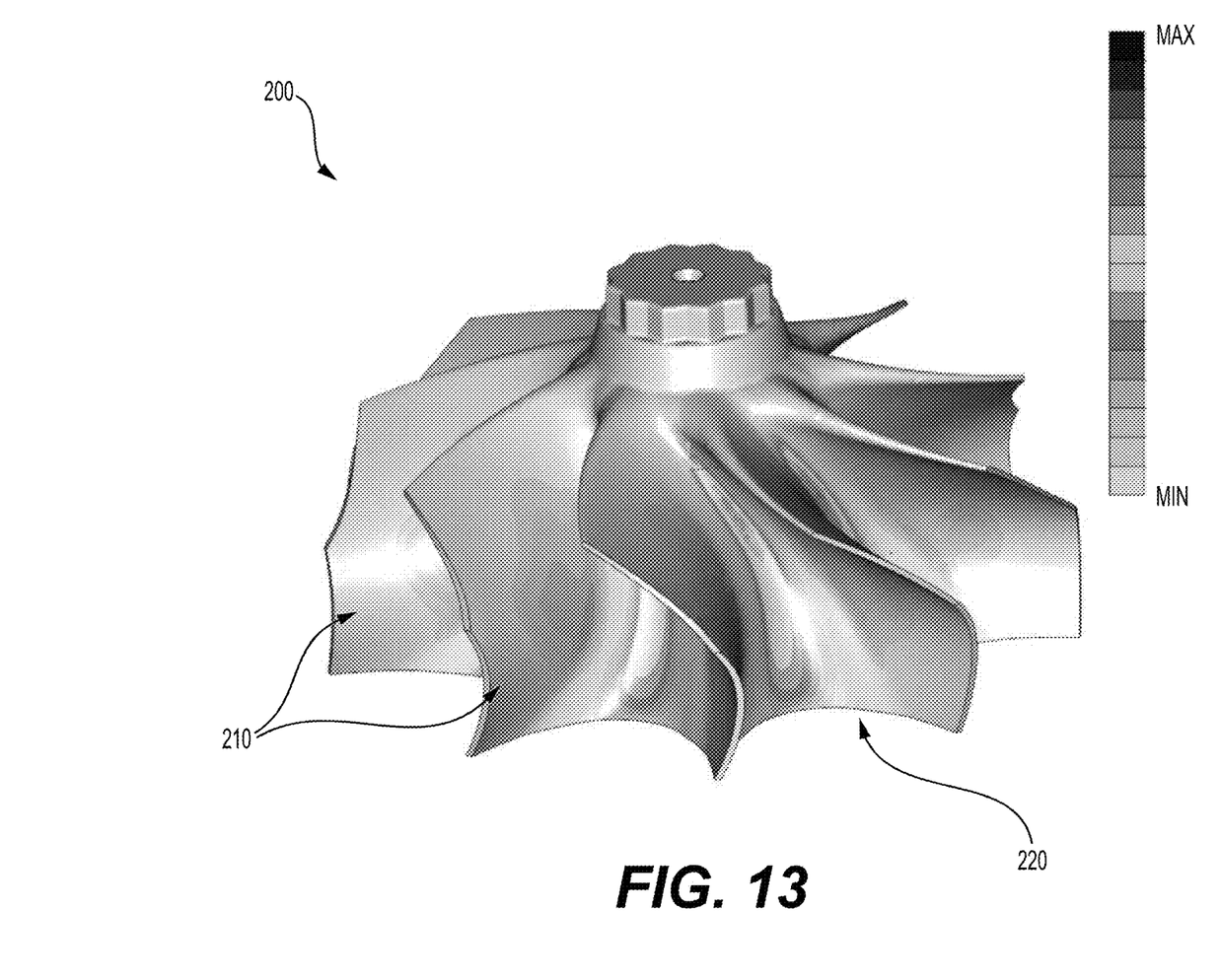
FIG. 13 is a perspective view of the turbine wheel of FIG. 4, with a simulation of in-use stress distribution.

With additional reference to FIGS. 11 to 13, a comparison of stress distributions of a prior art turbine wheel and the turbine wheel 200 according to the present technology is presented.

FIGS. 11 and 12 illustrate an example turbine wheel 15 according to the prior art. In the prior art wheel 15, turbine blades 17 are joined to a hub 19. Each prior art turbine blade 17 has a fillet 21 on each side of the blade 17. Each fillet 21 is separate from its neighboring fillet 21, such that the hub 19 defines a portion of the surfaces on the wheel 15 between neighboring fillets 21.

FIGS. 12 and 13 illustrate a simulation of stress distribution of the prior art turbine wheel 15 and the turbine wheel 200, respectively. Each simulation is illustrated with a same tone scale, where black is a maximum of the scale (approximately 600 MPa) and light gray is a minimum on the illustrated scale (approximately 300 MPa), with the palest portions portraying areas with less than 300 MPa. As is illustrated in FIG. 12, stress accumulates along the fillets 21 for the prior art wheel 15. Over time, this can lead to weakness of the connection between the blades 17 and the hub 19. In the present turbine wheel 200 in FIG. 13, in contrast, stresses are spread over the inter-blade portions 220 such that there are no high stress concentration points.

For use in the turbine 90, design of the turbine wheel 200 balances two contradictory goals. First, for operational efficiency, it is advantageous to decrease inertia of the turbine wheel 200 as much as possible. For strength of the turbine wheel 200, however, it is often preferable to have thicker blades 210 and/or to use material with greater strength or heat resistance. In the illustrated example, for instance, the turbine wheel 200 is formed from MAR-M 246+P (which has a density over 8 g/cm$^3$), although it is contemplated that different materials could be used.

Using the biomimicry design according to the present technology, the blades 210 can be thinner and the overall volume of the turbine wheel 200 can be reduced, while maintaining strength of the wheel 200 by decreasing the blade-to-hub stress peak at the fillets, as is illustrated above for the prior art wheel 15. As such, a denser material can be used, allowing the turbine wheel 200 to be formed from materials better adapted for higher heat. The present design further permits scalloping of the compressor side wall 240 of the turbine wheel 200, as is described above, further decreasing the overall mass.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A turbine wheel for a turbine of a turbocharger, the turbine wheel comprising:
    a plurality of turbine blades, the turbine wheel having an axis of rotation, the plurality of turbine blades being distributed evenly about the axis of rotation; and
    a plurality of inter-blade portions distributed evenly about the axis of rotation,
    each one of the plurality of inter-blade portions being disposed between two of the plurality of turbine blades, each one of the plurality of turbine blades being disposed between two of the plurality of inter-blade portions,
    the plurality of inter-blade portions and the plurality of turbine blades being integrally formed,
    a cross-section, taken along a plane normal to the axis of rotation, of a surface of each inter-blade portion of the plurality of inter-blade portions being described by a smooth curve extending between the two turbines blades of the plurality of turbine blades between which the inter-blade portion is disposed, wherein the smooth curve of the cross-section of the surface of each inter-blade portion is described by a curve fitted to a biomimicry design form extending between the first blade and the second blade.

2. The turbine wheel of claim 1, wherein the biomimicry design form is a tensile-triangle design form for reducing stress concentrations.

3. The turbine wheel of claim 1, further comprising:
    a compressor side surface extending normal to the axis of rotation at a first end of the turbine wheel; and
    wherein the compressor side surface has a scalloped form.

4. The turbine wheel of claim 3, wherein the compressor side surface occupies no more than 50% of an area of a circle circumscribing an outer-most edge of the compressor side surface.

5. The turbine wheel of claim 1, further comprising a hub portion, the plurality of turbine blades and the plurality of inter-blade portions being integrally formed with the hub portion.

6. The turbine wheel of claim 1, wherein the smooth curve of the cross-section of the surface of each inter-blade portion is concave.

7. A turbocharger for an engine, comprising:
    a turbine including a turbine wheel, the turbine wheel comprising:
        a plurality of turbine blades, the turbine wheel having an axis of rotation, the plurality of turbine blades being distributed evenly about the axis of rotation; and
        a plurality of inter-blade portions distributed evenly about the axis of rotation,
        each one of the plurality of inter-blade portions being disposed between two of the plurality of turbine blades, each one of the plurality of turbine blades being disposed between two of the plurality of inter-blade portions,
        the plurality of inter-blade portions and the plurality of turbine blades being integrally formed,
        a cross-section, taken along a plane normal to the axis of rotation, of a surface of each inter-blade portion of the plurality of inter-blade portions being described by a smooth curve extending between the two turbines blades of the plurality of turbine blades between which the inter-blade portion is disposed; and
    a compressor operatively connected to the turbine, the turbine driving the compressor when the turbocharger is in use, wherein the smooth curve of the cross-section of the surface of each inter-blade portion is described by a curve fitted to a biomimicry design form extending between the first blade and the second blade.

8. The turbocharger of claim 7, wherein the biomimicry design form is a tensile-triangle design form for reducing stress concentrations.

9. The turbocharger of claim 7, wherein the turbine wheel further comprises:
    a compressor side surface extending normal to the axis of rotation at a first end of the turbine wheel; and
    wherein the compressor side surface has a scalloped form.

10. The turbocharger of claim 9, wherein the compressor side surface occupies no more than 50% of an area of a circle circumscribing an outer-most edge of the compressor side surface.

11. The turbocharger of claim 7, wherein the turbine wheel further comprises a hub portion, the plurality of turbine blades and the plurality of inter-blade portions being integrally formed with the hub portion.

12. The turbocharger of claim 7, wherein the smooth curve of the cross-section of the surface of each inter-blade portion is concave.

* * * * *